March 18, 1952 J. COSTELLO ET AL 2,589,780
HOSE SUPPORT FOR PLASTIC TUBES
Filed Nov. 5, 1947
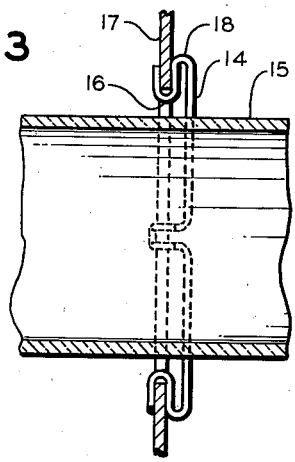
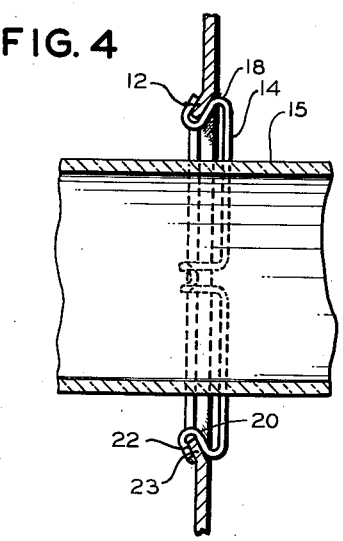
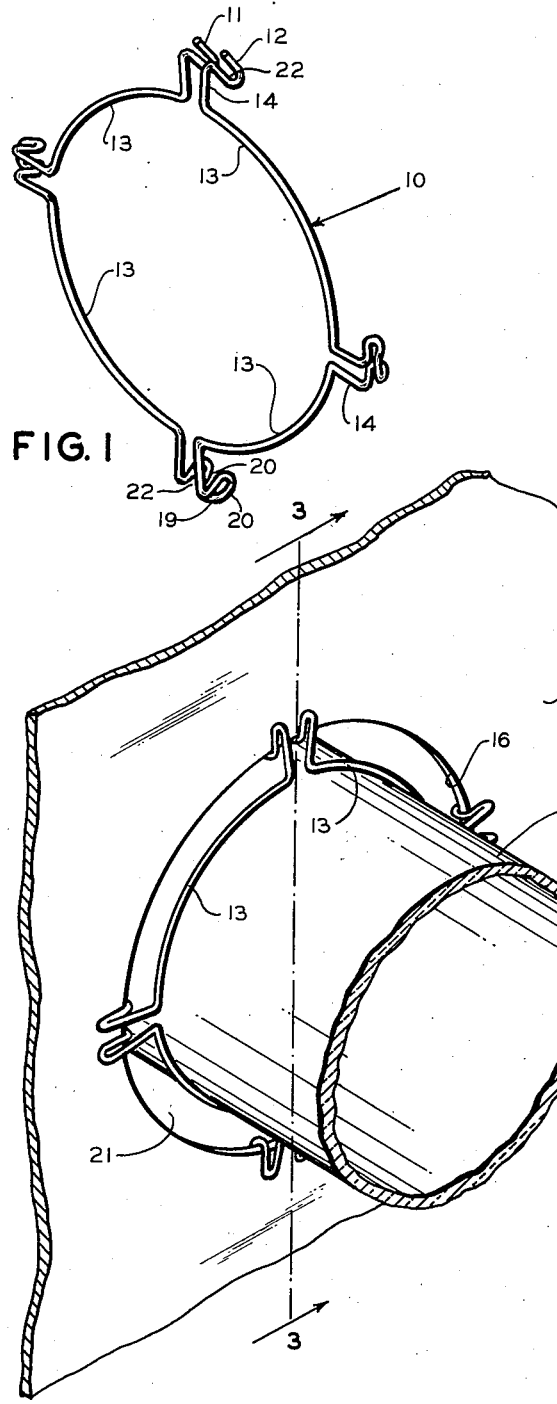
*INVENTOR.*
JOSEPH COSTELLO
BY HOWARD S. PRICE, JR.

Patented Mar. 18, 1952

2,589,780

UNITED STATES PATENT OFFICE 2,589,780

HOSE SUPPORT FOR PLASTIC TUBES

Joseph Costello, Rogers Forge, and Howard S. Price, Jr., Catonsville, Md., assignors to The Glenn L. Martin Company, Middle River, Md., a corporation of Maryland Application November 5, 1947, Serial No. 784,214

2 Claims. (Cl. 248—56)

This invention relates to spring clips and more particularly to a hose support for securing and holding air ducts free of the edge of an apertured metal bulkhead.

In the installation of heating and like facilities in an aircraft, it is necessary to pass relatively long runs of tubing through apertures formed in the bulkheads and like metal cross panels placed transversely of the craft. It is very essential that such tubing be securely anchored in place against undesired movement that might displace the tap-off connections and like fittings. The edges of such members are relatively sharp and, therefore, serious damage from cutting and abrading due to vibration is likely to result if the tube is allowed to contact these sharp edges. It is customary practice to conceal the air ducts and fittings back of the interior panelling of an aircraft on the original installation. For this reason, such parts naturally become highly inaccessible and servicing made necessary by accidental loosening or failure, for any reason, would prove extremely costly. Heretofore, various unsucccessful attempts have been made to solve these problems, one of which has been to secure such tubing with a relatively expensive and heavy bolted clamp that is susceptible to loosening during operation.

The present invention provides a lightweight inexpensive circular spring fastener, adapted for clipped-on circumferential engagement with a circular object, such as a tube or the like, having ends and mid-section portions in a second circular plane spaced form the first, and adapted for spring engagement with the edge of the bulkhead through which the tube passes to suspend the tube under spring tension free of the surrounding bulkhead.

It is among the objects of the present invention to provide a single wire support adapted for insertion in an aperture to engage under spring tension both sides of a bulkhead surrounding the aperture and secure a tubular object inserted therethrough spaced from the surrounding edge of said aperture.

Another object of the invention is to provide a spring support as a unitary structure to secure a tube or the like centered within an aperture formed in a wall wherein the support is adapted for insertion from either side of the wall.

Still another object is to provide an inexpensive tube support capable of being "snapped" into and out of engagement between a tube and the edge of an apertured wall structure.

Other objects of this invention will become apparent from the following description when taken in conjunction with the accompanying drawing in which like members refer to like parts in different views.

In the drawing:

Figure 1 is a perspective view of the spring support of this invention.

Figure 2 is a perspective view of the support in place securing and supporting a tube spaced from the edge of an apertured bulkhead.

Figure 3 is a section of line 3—3 of Figure 2.

Figure 4 is a section of a modified form of the support adapted for installation in a bevelled wall aperture.

Referring in detail to the drawings in Figure 1 is shown the construction of our support 10 from one piece of spring wire 11. The spring characteristics, diameter, and length of the wire 11 used to form the support 10 are determined by the load to be supported, and the diameter of the object held. We have discovered that the best results are attained in the supporting of a $2\frac{1}{16}$ inch outside diameter fiber airduct of conventional construction suspended within a $2\frac{5}{8}$ inch aperture of an aircraft bulkhead with a support formed of .049 inch diameter cold drawn music wire. The total length of wire required for such an installation being about $13\frac{3}{16}$ inches.

The wire 11 is preferably cold worked to provide a spring ring having a plurality of curved portions 13 equally spaced by the outwardly extending arms 14. The curved portions 13 are formed to substantially the same radius as the outside circumference of a tube 15, shown by Figures 2, 3 and 4, to be secured. The arms 14 are formed by bending spaced portions of the ring outwardly of sufficient length to span the distance between the tube and the supporting wall to which it is secured plus sufficient stock to provide for the securing channels 22 as hereinafter described.

The channels or hook portions 22 are formed at each end 12 and loops 19 by bending of these portions of the ring back toward the axial center line of the support. The radius of each of the loops 19 are such as to allow for spaced arrangement of the arms 14 formed by the parallel sides of each of said loops with the support in an engaged position. Likewise, the length of the wire 11, curved portions 13, and the spacing of the arms 14 is proportioned so that the ends 12 are spaced sufficiently apart when contracted for spring engagement as to be ready of movement into and out of the supported position. The width and arrangement of the U-shaped channels 22 are such as to extend beyond the edge 16 of the apertured wall 17 to provide for engagement under spring tension of both sides of said wall. In this manner with the spring placed in an engaged position with the support 10 contracted as a spring, there is placed a constant spring urge on the U-shaped channels 22 to attain a close engagement with the edge 16 of the wall 17 inserted in the channels. Depth of insertion of the edge 16 is sufficient to effect anchoring of the arched portions 18 against the bulkhead. The length of arms 14 is proportioned to span the distance between arch 18 and the tube 15, to place the arms under spring tension pivoted against the wall 17. In this manner, the spring urge developed in the arms 14 is utilized to effect torsional stress in the curve sections 13 so as to draw the support 10 into close encircled engagement with the tube 15 supported free of the bulkhead.

In making an installation of the support 10, the tube 15 or similar object to be held is first inserted through the aperture 21 and the support clipped over the tube from either side of the bulkhead as found convenient. The fact that the support 10 can be installed from either side of the supporting bulkhead or wall has a great advantage in that no prior planning as to placing of the support is required. One end 12 of the support 10 is snapped into place with the channel 22 latched under the edge 16 of the bulkhead after which the curved portion 13 is sprung against the tube 15, and each successive channel is latched into place in like manner so that on final completion of the installation, the opposite end of the support is positioned adjacent to but spaced from the end first inserted. In this manner the support 10 is positioned around the tube 15 with arms 14 placed in compression to twist the curved portions 13 into securing positions bearing against the outer periphery of the tube as best illustrated in Figure 2. In forming the support 10 the natural offset of the channels 22 relative to the arms 14 and curved portions 13 allows ample clearance between the bottoms of the channels and the curved portions placed on different planes. This arrangement is utilized to provide for unhampered spring action of all of the different portions of the support when placed in clamping position under spring tension.

Removal of the support is readily effected by a reversal of the installation procedure in which spring arms 14 are compressed by forcing an end 12 inwardly of the edge 16 to allow for progressively unlatching of the loops 19 and the other end from under the edge of the bulkhead.

Figure 4 shows a modified form of the support adapted for installation in a bulkhead aperture formed with a beveled edge 23. This type of support is formed with the channels 22 placed at a greater angle from the arms 14 than the support to be installed in the conventional aperture as illustrated in Figure 3. The bevelled type edge has become standard practice in aircraft construction in order to add additional strength to the bulkhead and avoid any tendency toward "oil canning." In the modified form of support 10, the angle of channels 22 relative to the arms 14 is sufficient to provide the required amount of spring tension in the arms to attain the same spring action against the outer periphery of tube 15 as previously described.

From the foregoing, it will be readily seen that the form of the support of this invention makes it well suited for supporting rods, wire bundles, and other cylindrical bodies.

Although we have described two embodiments of our invention in considerable detail, it is to be appreciated that certain variations of the invention may be effected by those skilled in the art without departing from the scope of the invention as defined in the claims.

We claim as our invention:

1. A support for frictionally securing a tubular member within an aperture in a bulkhead comprising a wire formed to provide generally circularly curved portions lying in a common plane and adapted for engagement with said tubular member, and spaced portions extending generally radially outwardly from said curved portions and having circumferentially positioned, outwardly opening U-shaped portions on the ends thereof adapted to engage both sides of said bulkhead about the edge of said aperture.

2. A support for frictionally securing a tubular member within an aperture in a bulkhead comprising a wire formed to provide generally circularly curved portions lying in a common plane and adapted for engagement with said tubular member, and spaced portions extending generally radially outwardly from said curved portion and having circumferentially positioned, outwardly opening U-shaped portions on the ends thereof adapted to engage both sides of said bulkhead about the edge of said aperture, said U-shaped portions being axially displaced from the plane of the curved tube engaging portions to effect torsional stress in said curved portions when the U-shaped portions are thus engaged with said bulkhead.

JOSEPH COSTELLO.
HOWARD S. PRICE, Jr.

REFERENCES CITED

The following references are of record in the file of this patent:

UNITED STATES PATENTS

| Number | Name | Date |
| --- | --- | --- |
| 2,140,441 | Clark | Dec. 13, 1938 |
| 2,141,878 | Roby | Dec. 27, 1938 |
| 2,219,327 | Miller | Oct. 29, 1940 |